6. COMPOSITIONS, COATING OR PLASTIC.

Patented Aug. 9, 1932

1,871,193

UNITED STATES PATENT OFFICE

WILLIAM K. NELSON, OF CHICAGO, ILLINOIS, ASSIGNOR TO INSULEX CORPORATION, OF CHICAGO, ILLINOIS, A CORPORATION OF DELAWARE

COMPOSITION CONSTRUCTION OR HEAT INSULATING MATERIAL

No Drawing. Original application filed May 11, 1925, Serial No. 29,564. Divided and this application filed October 19, 1927. Serial No. 227,350.

This application is a division of my application Serial No. 29,564 filed May 11, 1925, Patent No. 1,748,614.

My invention relates to a novel composition construction or heat insulating material and particularly to a material which in final form will be highly cellular and well adapted for various construction, heat insulating and fireproofing uses.

My invention contemplates the use of a finely divided material which will set in the presence of water, such as calcined calcium sulphate or gypsum, and a substance or substances which in combination with the aforesaid material and water and in the presence of a bubble producing medium or a bubble generating gas will function to emulsify the gas within the mass and sustain or maintain the bubbles by providing a protective covering therefor and thereby sustain the mass so that upon hydration and setting of the finely divided material a highly cellular body of uniform texture will be formed. In carrying out my invention, any suitable bubble generating gas or bubble producing agent may be employed. I prefer, however, to utilize an agent consisting of substances which may be introduced into the mix in a powdered form and which in the presence of water will chemically react to form a gas. Thus by introducing into the mix suitable quantities of aluminum sulphate and calcium carbonate a suitable bubble producing medium will readily be formed, the aluminum sulphate reacting with the water releases sulphuric acid which in turn reacts with the carbonate thereby forming carbon dioxide gas. One of the objects of my present invention is to provide an improved construction or heat and sound insulating material which in final form will be rigid and possess substantial strength even though the material is highly cellular in character and very light in weight. Other objects of my invention will appear hereinafter.

I have found that the final product hereinabove described possesses maximum strength when there is no substantial retardation of the natural process of crystallization and setting of the gypsum, and a further object of my present invention is to utilize a substance or substances which will not only function satisfactorily to emulsify the gas within the mass and to sustain or maintain the bubbles of the aerated mass but which will not retard to any substantial extent the hydration and setting of the gypsum, these three conditions or requirements being highly important in carrying out the invention. I have found that there are certain substances which in the combination will fulfil all three conditions to a fair extent and in this connection I will mention soap and gum arabic. In order to obtain certain and more satisfactory results, however, I have found it desirable to use separate substances. For example, a gas emulsifying substance, such as soap or saponin, will function satisfactorily in assisting in the formation of the bubbles by emulsification of the gas within the mass and a bubble reinforcing or bubble maintaining substance, such as talc, silica, or lamp black, will function satisfactorily in forming the desired surface film and protective coverings for the gas bubbles thus sustaining the mass; and none of the aforesaid substances will interfere in a deleterious way with or retard to any substantial extent the hydration and setting of the gypsum. The use of a substance which alone or the use of substances which jointly will fulfill the three conditions specified is particularly important and advantageous when it is desired to produce a product of very light weight, say thirteen to fourteen pounds per cubic foot. In such a light-weight product the cells must necessarily be either quite large or very numerous and it follows, therefore, that the mass must be properly conditioned to be acted upon by the large amount of bubble producing medium required, integrity of the bubbles must be preserved and finally the crystals forming the cell walls must be well interlocked or knit together so that the resultant cellular structure will be hard, rigid and possess strength.

In the preferred composition, I employ calcined gypsum as the major ingredient, a water insoluble carbonate such as calcium carbonate, aluminum sulphate, water, a small quantity of a gas emulsifying material such as soap, saponin or the like for conditioning the liquid mass for the production of the bubbles therein and for emulsifying the gas within the mass, and a small quantity of a suitable bubble sustaining or bubble maintaining colloidal substance of the hydrophobic ore non-wetting variety, such as talc, silica, gum arabic, lamp black or carbon black or other equivalents. The solid materials may each be added specially to the mix or such of them may be made use of as happens to be present in the major ingredient as an impurity in its native state. Some of the materials may be either added to the mix in the form of a solution previously prepared, or may be added to the compound in a dry state, and then the compound added to the water or the water added to the compound, it being immaterial which course is followed. All the solid materials should be finely ground and when mixed with the water, the mixing or stirring should preferably be carried out with intermittent short intervals of rest and in one direction only.

A satisfactory formula for the production of a final cellular product, wherein the bubble producing medium consists of carbon dioxide gas evolved within the mass, weighing approximately twenty pounds per cubic foot is as follows:

2 lbs. calcined gypsum (substantially free of impurities),
3 oz. aluminum sulphate,
1½ oz. calcium carbonate,
4 gms. (60 grains) soap, and
8 gms. (120 grains) talc.

The materials should be finely ground and thoroughly mixed and then introduced into or have added to them 26 liquid ounces of water. The mixture should be agitated or stirred in one certain direction, preferably with short intermittent periods of rest, for about one minute and then poured into a mold and allowed to set.

For the production of a final cellular product, wherein the bubble producing medium consists of a gas evolved within the mass, weighing thirteen to fourteen pounds per cubic foot, the following formula is used:

2 lbs. calcined gypsum (substantially free of impurities),
4 oz. aluminum sulphate,
3 oz. calcium carbonate,
6 gms. (90 grains) soap,
10 gms. (150 grains) gum arabic, and
28 liquid oz. water, the solid materials to be finely ground. The compounding of the materials is the same as in the preceding formula.

In case the major ingredient or any of the other ingredients are not of the average grade of purity certain modifications will have to be made in the formulæ. The use of fresh calcined gypsum is contemplated in the above formulæ, and when the gypsum is well aged a lesser quantity of water than that specified will suffice.

Such substances as soap or saponin show adsorption for the carbon dioxide gas and they function as effective emulsifying agents in the mass. Such substances also lower the surface tension of the fluid mass very considerably which obviously is advantageous for the production of a cellular mass because when a bubble is formed, an appreciable increase in the surface is involved and the higher the surface tension of the liquid mass, the more difficult it will be to produce bubbles therein. Such substances also tend to prepare or condition properly the liquid mass for the production or formation of the bubbles because they tend to increase the viscosity thereof and aid in the formation of a stabilized and a more viscous film on the surface of the mass, these conditions being highly desirable.

The stability of the aerated mass necessarily depends very largely on that of its constituent bubbles. The presence of a sufficient quantity of suitable colloidal particles in the interface of the liquid and the gas will make the bubble film so viscous that the air or gas cells will be reinforced and sustained. Such colloidal substances as talc, silica, lamp black, gum arabic and other equivalent hydrophobic substances or non-wettables function, in the combination, to reinforce and strengthen or sustain the bubbles because they concentrate in the interface and form a viscous bubble film. Since flocculation of bodies is a measure of the stability of a cellular mass, it is evident that the finer these colloidal ingredients are ground, the better the bubble film will be and the more sustentative the resultant structure will be. The presence in the mass of such colloidal particles obviously increases the surface viscosity of the mass because the adsorption of the gas by the colloidal particles tends to cause the particles to rise to the surface of the liquid mass and to keep them there thus producing a heavy film on the surface of the mass. The viscosity of the surface film of the mass, therefore, is considerably higher than that of the interior of the mass which is an ideal condition for the production of a satisfactory cellular structure. Due to the hydrophobic or non-wetting nature of the aforesaid colloidal particles in the combination and their concentration in the heavy surface film produced on the mass they serve as water-repellents at the surface of the final product.

I have found that some agents or substances, for example, soap or gum arabic may be used both for the emulsification of the gas and the maintenance of the bubbles in the aerated mass because a portion of each of these substances goes into solution and serves to emulsify the gas within the mass while the other portion remains in a finely divided state and concentrates in the interface and, therefore, serves to maintain the bubbles and sustain the mass. When soap or its equivalent is used as aforesaid, the cells of the resulting structure are quite numerous and small in size. However, more satisfactory results can be obtained and the various requirements better fulfilled when soap or its equivalent is used primarily as the gas emulsifying agent and talc or its equivalent is used as the bubble maintaining agent. In the latter case the cells of the final structure are relatively larger in size and the cell walls are appreciably stronger and tougher.

When a substance such as the major ingredient mentioned undergoes a crystallization process any undue delay or retardation in the process of crystallization modifies to a great extent the strength and character of the resulting crystalline structure. When any substantial delay or retardation takes place, the crystals are never well defined and do not form a system of optimum strength and purity. Furthermore, when considering a cellular composition, in cases where the crystallization of the major ingredient is not adversely interfered with the process of eliminating the excess moisture by drying by exposure to air proceeds under given conditions at a much faster and a uniform rate. These comparative results become especially noticeable during the stage of drying when the residual moisture retained in the composition is of low percentage before the final drying takes place.

None of the aforesaid gas emulsifying and bubble maintaining agents have any substantial retarding effect on the hydration and setting of the gypsum. In fact there is substantially no undesirable interference with the natural process of crystallization and setting of the gypsum. The final product, therefore, is rigid, strong and stable or durable.

When the agitation or stirring of the liquid mass is carried out in one certain direction there is little loss of the bubble producing medium and no substantial number of the cells is broken down. If the agitation or stirring is carried out first in one direction and then in another direction a considerable number of the gas cells are broken down which results in a loss of gas and non-uniformity of the cellular structure. When the agitation or stirring of the mass is carried out in one certain direction with intermittent periods of rest the mass will rise to a greater extent. This is due to the fact that mechanical stirring of the aerated mass while assisting in the reaction or formation of the gas involves on the other hand a loss of some of the gas due to diffusion and internal pressure. I have found that a short rest in the stirring tends to cut down this loss and causes the mass to rise until an equilibrium is established. Additional stirring in the same direction will then produce more gas which, if not lost, will tend to raise the mass higher.

Much better results are obtained when a water insoluble carbonate, such as calcium carbonate, is used instead of a water soluble carbonate or bicarbonate such as sodium bicarbonate. In the case of the water insoluble carbonate there is no material increase in the surface tension of the mass, and therefore, there is less difficulty in emulsifying the gas and maintaining the bubbles in the mass. Furthermore, the presence of a soluble carbonate in the combination would exert an adverse influence on the hydration of the gypsum. In practical use some of the carbonate will escape decomposition in the reaction and if a soluble carbonate is used this will introduce an objectionable feature after the mass finally sets whenever the mass comes into contact with moisture because the undecomposed carbonate is acted upon by the water and the gypsum under such a condition would tend to decompose and deteriorate and thus cause the mass to crumble. In addition to the above enumerated disadvantages, whenever a soluble carbonate or bicarbonate is used for the purpose of producing the gas, one of the products of the reaction is a soluble sulphate such as sodium sulphate. The sodium sulphate remains in solution for awhile from which it subsequently crystallizes with water of crystallization; and in doing so it generates or causes a destructive expansive force in the interior of the surrounding structure. On the other hand when a water insoluble carbonate is used none of these complications or adverse influences are present.

In practicing the invention, consideration must be given to the degree of hardness and the purity of the water used. The presence of certain free hydrocarbons such as ordinary oil or grease in the water will interfere seriously with the formation of the gas bubbles and with their stabilization. If the water is very hard special precaution should be taken in using it in the combination such as previous softening of the water or increasing the amount of soap in the mix.

The final product of my invention will be found to be rigid, strong and durable. The air cells will be found to be uniformly distributed and of uniform size throughout the structure. The excess moisture present in the product after hydration and setting of the mass has taken place evaporates from the mass quickly. The product may be precast at a factory in the form of partition tile, slabs, panels, sheets and the like or the ingredients for the product may be supplied in dry form and transported to the place of use where, merely by the addition of the proper amount of water, the product may be readily cast by any unskilled laborer in molds, forms, etc. It will be apparent, therefore, that the composition material is well adapted for various construction, heat and sound insulating and fireproofing uses.

While I have described my invention in detail, I do not wish to limit my invention thereto or thereby as some of the ingredients mentioned may be omitted, other ingredients may be employed, changes may be made in the proportions of the ingredients and changes may also be made in the manner of compounding the ingredients all without departing from the spirit or principles of the invention.

I claim:—

1. A composition construction of heat insulating material of a cellular texture weighing approximately twenty pounds per cubic foot comprising the set product of a mixture compounded in substantially the following proportions and comprising 2 lbs. calcined gypsum, 3 oz. aluminum sulphate, 1½ oz. calcium carbonate, 4 grams soap, 8 grams talc, and 26 liquid oz. water.

2. A composition construction or heat insulating material of a cellular texture comprising the set product of a mixture comprising water, a finely divided material containing calcined calcium sulphate, a gas in the mixture for forming bubbles therein, a gas adsorbing or emulsifying substance selected from the group consisting of gum arabic, soap and saponin, and a bubble strengthening substance of colloidal particles selected from the group consisting of talc, silica and lamp black, said last named substance being used in such quantities as to have substantially no retarding effect on the hydration and setting of the calcium sulphate.

3. A composition construction or heat insulating material of a cellular texture comprising the set product of a mixture comprising water, a finely divided material containing calcined calcium sulphate, a chemically reacting gas generating and bubble producing agent, a gas adsorbing or emulsifying substance selected from the group consisting of gum arabic, soap and saponin, and a bubble strengthening substance of colloidal particles selected from the group consisting of talc, silica and lamp black, said last named substance being used in such quantities as to have substantially no retarding effect on the hydration and setting of the calcium sulphate.

4. A composition construction or heat insulating material of a cellular texture comprising the set product of a mixture comprising water, calcined gypsum as the major ingredient, an acid reacting salt, a carbonate compound, a gas adsorbing or emulsifying substance selected from the group consisting of gum arabic, soap and saponin, and a bubble strengthening substance of colloidal particles selected from the group consisting of talc, silica and lamp black, said last named substance being used in such quantities as to have substantially no retarding effect on the hydration and setting of the gypsum.

5. A composition construction or heat insulating material of a cellular texture comprising the set product of a mixture comprising water, calcined gypsum as the major ingredient, aluminum sulphate, calcium carbonate, a gas adsorbing or emulsifying substance selected from the group consisting of gum arabic, soap and saponin, and a bubble strengthening substance of colloidal particles selected from the group consisting of talc, silica and lamp black, said last named substance being used in such quantities as to have substantially no retarding effect on the hydration and setting of the gypsum.

6. A composition construction or heat insulating material of a cellular texture comprising the set product of a mixture comprising water, a finely divided material containing calcined calcium sulphate, a gas which on introduction into the mixture forms bubbles therein, soap, and talc, the soap and talc being used in such quantities as to have substantially no retarding effect on the hydration and setting of the calcium sulphate.

7. A composition construction or heat insulating material of a cellular texture comprising the set product of a mixture comprising water, a finely divided material containing calcined calcium sulphate, a chemically reacting gas generating and bubble producing agent, soap, and talc, the soap and talc being used in such quantities as to have substantially no retarding effect on the hydration and setting of the calcium sulphate.

8. A composition construction or heat insulating material of a cellular texture comprising the set product of a mixture comprising water, calcined gypsum as the major ingredient, an acid reacting salt, a carbonate compound, soap, and talc, the soap and talc being used in such quantities as to have substantially no retarding effect on the hydration and setting of the gypsum.

9. A composition construction or heat insulating material of a cellular texture comprising the set product of a mixture comprising water, calcined gypsum as the major ingredient, aluminum sulphate, calcium carbonate, soap, and talc, the soap and talc being used in such quantities as to have substantially no retarding effect on the hydration and setting of the gypsum.

10. A dry mixture for gauging with water and suitable for making cellular casts weighing approximately twenty lbs. per cubic foot compounded in substantially the following proportions and comprising 2 lbs. calcined gypsum, 3 oz. aluminum sulphate, 1½ oz. calcium carbonate, 4 grams soap, and 8 grams talc.

11. A dry mixture for gauging with water and suitable for making cellular casts and comprising a finely divided material containing calcium sulphate, a chemically reactive gas generating agent for producing bubbles, a gas adsorbing or emulsifying substance selected from the group consisting of gum arabic, soap and saponin, and a bubble strengthening substance of colloidal particles selected from the group consisting of talc, silica and lamp black, said last named substance being used in such quantities as to have substantially no retarding effect on the hydration and setting of the calcium sulphate.

12. A dry mixture for gauging with water and suitable for making cellular casts and comprising calcined gypsum as the major ingredient, an acid reactive salt, a carbonate compound, a gas adsorbing or emulsifying substance selected from the group consisting of gum arabic, soap and saponin, and a bubble strengthening substance of colloidal particles selected from the group consisting of talc, silica and lamp black, said last named substance being used in such quantities as to have substantially no retarding effect on the hydration and setting of the gypsum.

13. A dry mixture for gauging with water and suitable for making cellular casts and comprising calcined gypsum as the major ingredient, aluminum sulphate, calcium carbonate, a gas adsorbing or emulsifying substance selected from the group consisting of gum arabic, soap and saponin, and a bubble strengthening substance of colloidal particles selected from the group consisting of talc, silica and lamp black, said last named substance being used in such quantities as to have substantially no retarding effect on the hydration and setting of the gypsum.

14. A dry mixture for gauging with water and suitable for making cellular casts and comprising a finely divided material containing calcined calcium sulphate, a chemically reactive gas generating agent for producing bubbles, soap, and talc, the soap and talc being used in quantities as to have substantially no retarding effect on the hydration and setting of the calcium sulphate.

15. A dry mixture for gauging with water and suitable for making cellular casts and comprising calcined gypsum as the major ingredient, an acid reactive salt, a carbonate compound, soap, and talc, the soap and talc being used in such quantities as to have substantially no retarding effect on the hydration and setting of the gypsum.

16. A dry mixture for gauging with water and suitable for making cellular casts and comprising calcined gypsum as the major ingredient, aluminum sulphate, calcium carbonate, soap, and talc, the soap and talc being used in such quantities as to have substantially no retarding effect on the hydration and setting of the gypsum.

WILLIAM K. NELSON.